United States Patent

Coffinberry

[11] Patent Number: 5,901,548
[45] Date of Patent: *May 11, 1999

[54] AIR ASSIST FUEL ATOMIZATION IN A GAS TURBINE ENGINE

[75] Inventor: George A. Coffinberry, West Chester, Ohio

[73] Assignee: General Electric Company, Cincinnati, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/780,083

[22] Filed: Dec. 23, 1996

[51] Int. Cl.$^6$ .................................. F02C 7/12; F02C 7/22
[52] U.S. Cl. .............................. 60/39.06; 60/728; 60/740
[58] Field of Search .............................. 60/39.06, 39.07, 60/39.183, 39.75, 39.83, 728, 740

[56] References Cited

U.S. PATENT DOCUMENTS

| | | |
|---|---|---|
| 2,341,490 | 2/1944 | Traupel .................................. 60/39.183 |
| 2,595,759 | 5/1952 | Buckland et al. ........................ 60/740 |
| 3,756,020 | 9/1973 | Moskowitz et al. . | 
| 4,792,278 | 12/1988 | Emerson ................................ 415/178 |
| 4,896,499 | 1/1990 | Rice . |
| 5,036,678 | 8/1991 | Renninger et al. . |
| 5,134,844 | 8/1992 | Lee et al. . |
| 5,351,477 | 10/1994 | Joshi et al. . |
| 5,392,614 | 2/1995 | Coffinberry . |
| 5,394,687 | 3/1995 | Chen et al. . |
| 5,511,374 | 4/1996 | Glickstein et al. .................... 60/39.07 |

OTHER PUBLICATIONS

Article entitled "Atomization of Coal Water Mixtures: Evaluation of Fuel Nozzles and Cellulose Gum Simulant", by T.J. Rosfjord, United Technologies Research Center.

Primary Examiner—Louis J. Casaregola
Attorney, Agent, or Firm—Andrew C. Hess; Rodney M. Young

[57] ABSTRACT

A gas turbine engine including air cooling and compressing means configured so that, in one embodiment, cool air from the cooling and compressing means is supplied to the combustor for cooling the combustor and then, after cooling at least a portion of the combustor, for mixing with fuel in the fuel injector, is described. In one form, the combustor includes a flowpath in flow communication with cool air supplied by the cooling and compressing means. The air flows through the flowpath from an aft portion to an outlet located at the fuel injector. The cooling air, after having cooled walls of the combustion chamber, mixes with fuel in the fuel injector. Mixing the high pressure air from the cooling and compressing means with the fuel in the fuel injector facilitates dispersion of fuel from the fuel injector into the combustion chamber, and also aids in increasing the fuel/air energy shear gradients. As a result, the injection velocity is believed to be significantly increased, and NOx emissions are believed to be reduced.

13 Claims, 2 Drawing Sheets

AIR ASSIST FUEL ATOMIZATION IN A GAS TURBINE ENGINE

FIELD OF THE INVENTION

The present invention relates generally to a combustor for a gas turbine engine, and more particularly to such a combustor coupled to a turbocooler for receiving cooling air for cooling the combustor and then for combustion.

BACKGROUND OF THE INVENTION

A gas turbine engine includes a core engine having, in serial flow relationship, a high pressure compressor (also called a core compressor) to compress the airflow entering the core engine, a combustor in which a mixture of fuel and the compressed air is burned to generate a propulsive (combustion) gas flow, and a high pressure turbine which is rotated by the propulsive gas flow and which is connected by a larger diameter shaft to drive the high pressure compressor. A typical aircraft bypass turbofan gas turbine engine adds a low pressure turbine (located aft of the high pressure turbine) which is connected by a smaller diameter coaxial shaft to drive a front fan (located forward of the high pressure compressor) which may also drive a low pressure compressor (located between the front fan and the high pressure compressor). The low pressure compressor sometimes is called a booster compressor or simply a booster. It is understood that the term "compressor" includes, without limitation, high pressure compressors and low pressure compressors. A flow splitter, located between the fan and the first (usually the low pressure) compressor, separates the air which exits the fan into a core engine airflow and a surrounding bypass airflow. The bypass airflow from the fan exits the fan bypass duct to provide most of the engine thrust for the aircraft. Some of the engine thrust comes from the core engine airflow after it flows through the low and high pressure compressors to the combustor and is expanded through the high and low pressure turbines and accelerated out of the exhaust nozzle.

Cooling of engine hot section components, such as the combustor, is necessary because of the thermal "redline" limitations of the materials used in the construction of such components. Typically such cooling of the combustor is accomplished by using a significant amount of air which exits the compressor. This cooling air bypasses the combustion chamber and is used to cool the combustor (e.g., the combustor liners) as well as to cool, for example, turbine components. The cooling air, after cooling the combustor (and turbine components), re-enters the gas path downstream of the combustor. Because this cooling air is not available inside the combustion chamber, the combustor has to operate at a higher fuel to air ratio which results in a higher combustor temperature in order to provide a desired turbine inlet temperature which is required for engine power and efficiency. However, the higher combustion chamber temperature generates more undesirable NOx emissions.

Gas turbine engine NOx emissions from operation on liquid fuels is at least partially the result of stoichiometric fuel-air ratio in the vicinity of the liquid fuel droplets. Above the pseudo-critical pressure of jet fuel (approximately 350 psia), liquid droplets absorb heat by convection and radiation. Once the temperature of the droplet reaches the pseudocritical temperature (approximately 750° F.), the droplet loses surface tension and disperses via air shear forces into a fuel-rich concentration of gaseous fuel and air molecules. With additional mixing with air, the gas mixture reaches ignition fuel-air ratio (still fuel rich) and burns. Since the engine overall fuel air ratio is fuel lean, there is a region where the gaseous fuel-air ratio is at or near stoichiometric concentration and the flame temperature is at a maximum (about 4000° F.).

NOx is produced by the reactions N2+O–>NO+N followed by O2+N–>NO+0. The rate of the second reaction (O2+N) increases NOx by a factor of five over a peak combustor temperature of 3000° F. when the fuel droplets burn at 4000° F. The relative NOx increase is much greater for lower engine power levels.

It would be desirable to lower the NOx emissions of a gas turbine engine without adversely affecting the engine efficiency. It also would be desirable to achieve such reduced NOx emissions without significantly increasing the cost of the engine.

SUMMARY OF THE INVENTION

These and other objects and advantages may be provided in a gas turbine engine including a turbocooler and configured so that cool air from the turbocooler is supplied to the combustor. In one embodiment, the cool air first is used to cool the combustor and then the spent cooling air is used for combustion, i.e., air assist atomization. More particularly, gas turbine engines including turbocoolers are known, such as the engine described in U.S. Pat. No. 5,392,614, entitled Gas Turbine Engine Cooling System, which patent is assignee to the present assignee. By providing cooling air from the turbocooler described in the above referenced patent to a combustor constructed in accordance with the present invention, it is believed that NOx emissions are reduced yet engine efficiency and operation characteristics are not adversely affected, and are possibly even enhanced.

In one form, the combustor includes flowpaths which are in flow communication with cool air supplied by the turbocooler. Air flows through the flowpaths from an aft portion to an outlet located at a diffuser. The cooling air, after having cooled walls of the combustion chamber, mixes with the fuel in the fuel injector so that a substantially uniform mixture of assist air and fuel exits the injector. Mixing the high pressure air from the turbocooler with the fuel facilitates dispersion of fuel from the fuel injector into the combustion chamber, and also aids in increasing the fuel/air energy shear gradients. As a result, the injection velocity is believed to be significantly increased, and NOx emissions are believed to be reduced.

DETAILED DESCRIPTION OF THE DRAWINGS

Gas turbine engines (such as turbojet engines, bypass turbofan engines, turboprop engines, and turboshaft engines) may be used to power flight vehicles (such as planes, helicopters, and missiles) and may also be used to power ships, tanks, electric power generators, and pipeline pumping apparatus. For purposes of description, the invention is described herein with respect to an industrial gas turbine engine. However, it is understood that the invention is equally applicable to other types and/or uses of gas turbine engines. Further, the present invention generally relates to using cooling air from a turbocooler to cool components of the engine combustor, and to using the "spent" cooling air for combustion. Gas turbine engines including turbocoolers are known, such as the engine described in U.S. Pat. No. 5,392,614, entitled Gas Turbine Engine Cooling System, which patent is assigned to the present assignee and hereby incorporated herein, in its entirety, by reference.

Figure 1:
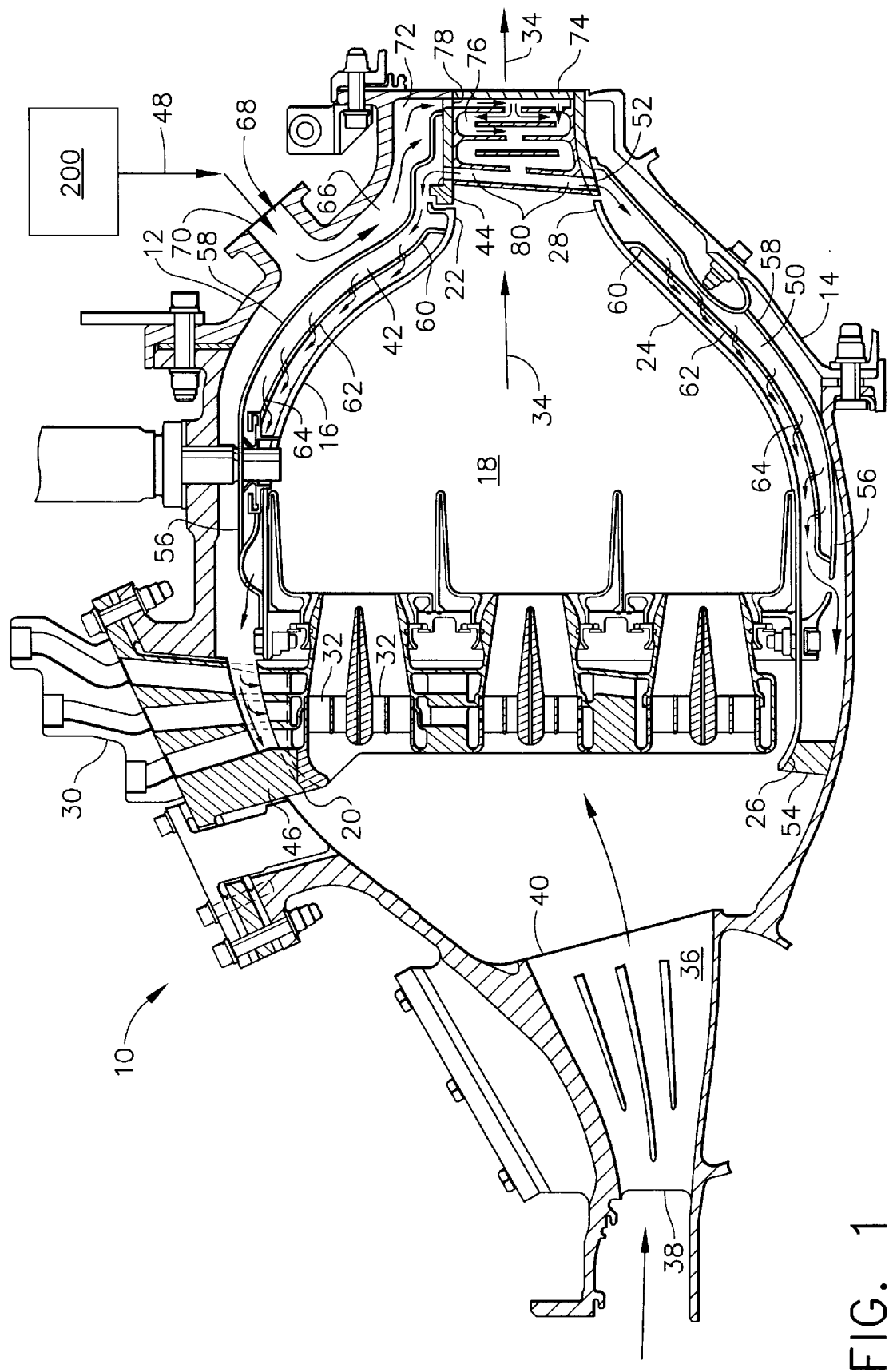
FIG. 1 is a schematic illustration of a portion of a gas turbine engine in accordance with one embodiment of the present invention.

FIG. 1 illustrates a combustor 10 in accordance with one embodiment of the present invention. Although combustor 10 is of the triple-dome annular type, the invention is equally applicable to a single or double-dome annular type as well as to other types of combustors for gas turbine engines, such as to cellular (can) combustor systems and to cannular combustor systems integral or separate from the gas turbine engine, as can be appreciated by those skilled in the art.

Combustor 10 includes a combustor outer casing 12 and a combustor inner casing 14. Combustor 10 further includes a combustor outer liner 16 disposed proximate combustor outer casing 12, which at least partially bounds a combustion chamber 18 and has generally longitudinally forward and aft portions 20 and 22. Likewise, combustor 10 also includes a combustor inner liner 24 which is disposed proximate combustor inner casing 14, which at least partially bounds combustion chamber 18, and which has generally longitudinally forward and aft portions 26 and 28. For the purposes of describing the invention, it is understood that the longitudinally forward portion of the combustor inner and outer liners includes the inner and outer combustor cowls, and the like. Preferably, each combustor liner 16 and 24 is an imperforate combustor liner with respect to cooling air (i.e., the liner itself has no cooling air holes). Combustor 10 has a fuel injector 30 having a fuel nozzle 32 disposed in combustion chamber 18. Combustion gas flow direction 34 in combustion chamber 18 extends generally longitudinally aft from fuel nozzle 32. Combustor 10 also has a diffuser 36 disposed longitudinally forward of fuel nozzle 32, with diffuser 36 having an inlet 38 in fluid communication with the high pressure compressor of the gas turbine engine and having an outlet 40 in fluid communication with fuel nozzle 32.

Combustor 10 contains an outer coolant flowpath 42 between combustor outer casing 12 and combustor outer liner 16, such outer coolant flowpath 42 has an inlet 44 proximate longitudinally aft portion 22 of combustor outer liner 16 and extend to wall portion 46. Inlet 44 is in fluid communication, via duct 48, with the turbocooler. The turbocooler provides cooling air of lower temperature and higher pressure (i.e., total pressure) than that of diffused air from diffuser 36, as can be appreciated by those skilled in the art.

Combustor 10 also contains an inner coolant flowpath 50 between combustor inner casing 14 and combustor inner liner 24, such inner coolant flowpath 50 having an inlet 52 proximate longitudinally aft portion 28 of combustor inner liner 24 and extends to a wall portion 54 proximate longitudinally forward portion 26 of combustor inner liner 24. Like outer coolant flowpath inlet 44, inlet 52 is in fluid communication, via duct 48, with the turbocooler. Again, the turbocooler provides cooling air of lower temperature and higher pressure (i.e., total pressure) than that of diffused air from diffuser 36, as can be appreciated by those skilled in the art.

"Spent" cooling air mixes with the fuel and flows with the fuel through outer (O), middle (M) and inner (I) fuel zones, as described below in more detail. Each coolant flowpath 42 and 50 includes a shield 56 having a portion 58 spaced apart from and disposed between its respective combustor liner 16 and 24 and combustor casing 12 and 14, and each coolant flowpath further includes a plate 60 having a portion 62 with impingement cooling openings 64. Plate portion 62 is spaced apart from and disposed between its respective combustor liner 16 and 24 and shield 56. Each coolant flowpath inlet 44 and 52 receives cooling air between its respective plate 60 and shield 56.

An introductory flowpath, such as outer introductory flowpath 66 between outer combustor casing 12 and respective shield 56 has a longitudinally forward segment 68 including an inlet 70 in outer combustor casing 12 and has a longitudinally aft segment 72 disposed longitudinally aft of inlet 44 of outer coolant flowpath 42. Introductory flowpath inlet 70 is in fluid communication with the turbocooler via duct 48 and longitudinally aft segment 72 is in fluid communication with inlet 44 of outer coolant flowpath 42. Combustor 10 includes a row of nozzle vanes 74 disposed proximate longitudinally aft portion 22 and 28 of each combustor liner 16 and 24 and has an internal coolant passageway 76 with a coolant entrance 78 in fluid communication with longitudinally aft segment 72 of respective introductory flowpath 66 and with a coolant exit 80 in fluid communication with the inlet 44 and 52 of respective coolant flowpath 42 and 50.

During engine operation, combustor 10 has its combustor liners 16 and 24 impingement cooled, with compressor-derived cooling air, from aft (where the coldest cooling air is most efficiently used to cool the hottest combustor regions) to forward. The "spent" cooling air then mixes with the fuel. Mixing the high pressure "spent" cooling air from the turbocooler with the fuel facilitates dispersion of fuel from fuel injector 30 into combustion chamber 18. Such arrangement also aids in increasing the fuel/air energy shear gradients in chamber 18. As a result, the injection velocity is believed to be significantly increased, and NOx emissions are believed to be reduced.

Figure 2:
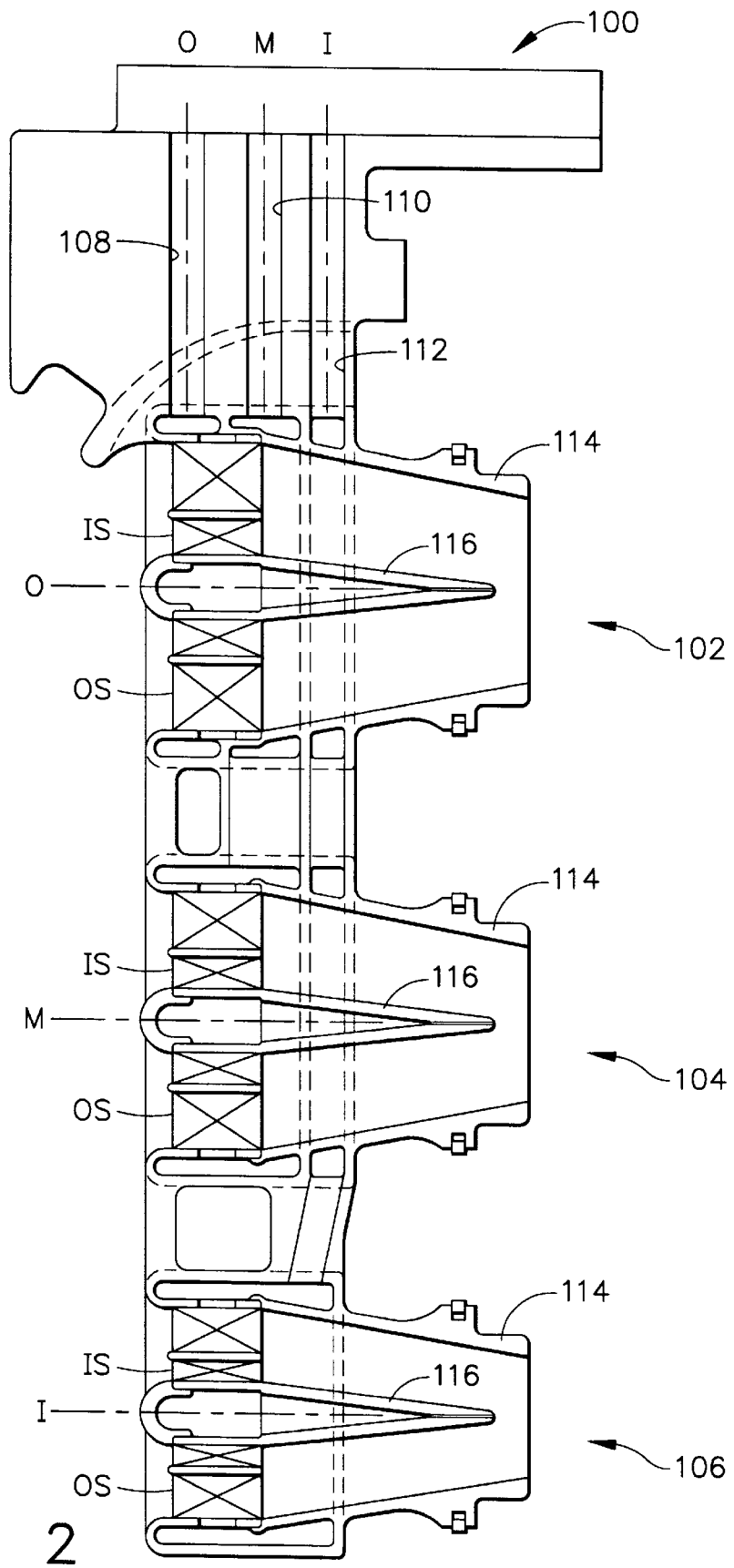
FIG. 2 is a cross section view of a fuel injector in accordance with one embodiment of the present invention.

FIG. 2 is a cross section view of a fuel injector 100 in accordance with one embodiment of the present invention. Injector 100 includes outer, middle and inner swirler assemblies 102, 104 and 106, and fuel/air flow paths 108, 110, and 112 extend through injector 100 to respective swirler assemblies 102, 104, and 106. Each swirler assembly 102, 104, and 106 includes an inner swirler IS and an outer swirler OS which are brazed or otherwise set in a swirl cup 114, and rotate around a hub 116. Inner and outer swirlers IS and OS typically are counter-rotating Swirlers IS and OS have vanes at an angle in the 40°–60° range with respect to an axis through the center of respective swirlers IS and OS. Fuel flows from an annular cavity outside each vane set into each vane and then out holes on the suction side of each vane. Examples of swirler and vane constructions which may be utilized are set forth in U.S. Pat. No. 5,341,477, which is assigned to the present assignee and hereby incorporated herein, in its entirety, by reference.

Spent cooling air flows into each fuel supply zone O, M, and I, and mixes with the fuel. If the flow of fuel and assist air is high enough to avoid separation due to gravity (air rising to the top of the engine and fuel settling to the bottom of the engine, a uniform mixture of assist air and fuel should exit the holes in the vanes. Alternatively, swirler assemblies 102, 104 and 106 can be modified so that air is drawn close to the vane fuel injection holes using, for example, a double wall vane. Air would enter the inner vane cavity and fuel would enter the cavity between the inner and outer vane walls. For air to flow from the inner cavity to outside the vane, the air must cross the fuel cavity and in doing so causes fuel to break-up and atomize due to fluid shear stress.

Because fuel flows out the vane holes in a direction normal to engine compressor air from diffuser 36, additional fluid shear gradient (from higher liquid fuel velocity provided by assist air) will provide additional improved atomization and improved overall air-fuel mixing in and downstream of air swirlers. Both liquid droplet size (droplet clusters) and air-fuel mixing rate influence localize combustion temperatures and emissions at all power levels.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, although the turbocooler air is described as being used to cool certain components of a combustor prior to delivery to a fuel injector, it is contemplated that the cool turbocooler air could be "spent" for cooling other components of an engine, or otherwise, prior to delivery to the fuel injector. Accordingly, the spirit and scope of the invention are to be limited only by the terms of the appended claims.

What is claimed is:

1. A gas turbine engine comprising:
   a compressor;
   means for cooling and compressing air output by said compressor; and
   a combustor comprising a casing, a liner proximate said casing and at least partially bounding a combustion chamber, a fuel injector in flow communication with said cooling and compressing means so that air from said cooling And compressing means is provided to said fuel injector for air assist atomization, and a coolant flowpath between said casing and said liner having an inlet at a longitudinally aft portion of said liner and having an outlet at said fuel injector so that spent cooling air flows into said fuel injector, said coolant inlet coupled to said cooling and compressing means for receiving cooling air from said cooling and compressing means.

2. A gas turbine engine in accordance with claim 1 wherein said combustor further comprises said fuel injector having a fuel nozzle in said combustion chamber and a diffuser located forward of said fuel nozzle and in flow communication with said compressor and having an outlet in flow communication with said fuel nozzle.

3. A gas turbine engine in accordance with claim 2 further comprising a shield at least partially spaced apart from and between said liner and said casing, and a plate having a plurality of impingement cooling openings, said plate at least partially spaced apart from and between said liner and said shield.

4. A gas turbine engine in accordance with claim 3 wherein said coolant flowpath comprises an outer coolant flowpath between said combustor casing and said combustor liner, such outer coolant flowpath having an inlet proximate said longitudinally aft portion of said combustor liner.

5. A gas turbine engine in accordance with claim 2 wherein said flowpath comprises an introductory flowpath between said casing and said liner, said introductory flowpath comprising an inlet coupled to said cooling and compressing means.

6. A gas turbine engine in accordance with claim 5 wherein said introductory flowpath inlet is coupled to said cooling and compressing means by a duct.

7. A gas turbine engine in accordance with claim 2 wherein said combustor further comprises a row of nozzle vanes proximate said longitudinally aft portion of said liner, said nozzle vanes having an internal coolant passageway.

8. A gas turbine engine in accordance with claim 7 wherein said flowpath comprises an introductory flowpath between said casing and said liner, said introductory flowpath comprising an inlet coupled to said cooling and compressing means, and a longitudinally aft segment in flow communication with an inlet of said nozzle vane internal coolant passageway.

9. A gas turbine engine comprising:
   a compressor;
   means for cooling and compressing air output by said compressor; and
   a combustor comprising a casing, a liner proximate said casing and at least partially bounding a combustion chamber, a fuel injector having a fuel nozzle in said combustion chamber, a diffuser located forward of said fuel nozzle and in flow communication with said compressor and having an outlet in flow communication with said fuel nozzle, a shield at least partially spaced apart from and between said liner and said casing, and a plate having a plurality of impingement cooling openings, said plate at least partially spaced apart from and between said liner and said shield, and a coolant flowpath between said casing and said liner having an inlet at a longitudinally aft portion of said liner and having an outlet at said fuel injector so that scent cooling air flows into said fuel injector, said coolant inlet coupled to said cooling and compressing means for receiving cooling air from said cooling and compressing means, and said coolant flowpath comprising an introductory flowpath between said casing and said liner, said introductory flowpath comprising an inlet coupled to said cooling and compressing means.

10. A gas turbine engine in accordance with claim 9 wherein said coolant flowpath comprises an outer coolant flowpath between said combustor casing and said combustor liner, such outer coolant flowpath having an inlet proximate said longitudinally aft portion of said combustor liner.

11. A gas turbine engine in accordance with claim 9 wherein said introductory flowpath inlet is coupled to said cooling and compressing means by a duct.

12. A gas turbine engine in accordance with 9 wherein said combustor further comprises a row of nozzle vanes proximate said longitudinally aft portion of said liner, said nozzle vanes having an internal coolant passageway, and a longitudinally aft segment of said introductory flowpath in flow communication with an inlet of said nozzle vane internal coolant passageway.

13. A method for injecting fuel into a combustion chamber of a combustor of a gas turbine engine, the engine including a fuel injector having a fuel nozzle in the combustion chamber and means for cooling and compressing air, said method comprising the steps of:
   cooling components of the combustor with air from the cooling and compressing means;
   mixing the air from the cooling and compressing means and fuel at the fuel injector; and
   injecting the mixed air and fuel into the combustion chamber.

\* \* \* \* \*